(12) United States Patent
Vollmerhausen

(10) Patent No.: US 10,922,802 B2
(45) Date of Patent: Feb. 16, 2021

(54) FUSION OF THERMAL AND REFLECTIVE IMAGERY

(71) Applicant: Richard H. Vollmerhausen, Lake Mary, FL (US)

(72) Inventor: Richard H. Vollmerhausen, Lake Mary, FL (US)

( * ) Notice: Subject to any disclaimer, the term of this patent is extended or adjusted under 35 U.S.C. 154(b) by 0 days.

(21) Appl. No.: 16/559,622

(22) Filed: Sep. 3, 2019

(65) Prior Publication Data

US 2020/0074607 A1 Mar. 5, 2020

Related U.S. Application Data

(60) Provisional application No. 62/726,453, filed on Sep. 4, 2018.

(51) Int. Cl.

| *G06T 5/50* | (2006.01) |
|---|---|
| *G06T 7/90* | (2017.01) |
| *G06T 3/40* | (2006.01) |
| *G06T 5/00* | (2006.01) |
| *G06T 5/20* | (2006.01) |
| *G09G 5/04* | (2006.01) |
| *G09G 5/10* | (2006.01) |

(52) U.S. Cl.
CPC .............. *G06T 5/50* (2013.01); *G06T 3/4015* (2013.01); *G06T 5/009* (2013.01); *G06T 5/20* (2013.01); *G06T 7/90* (2017.01); *G09G 5/04* (2013.01); *G09G 5/10* (2013.01); *G06T 2207/10024* (2013.01); *G06T 2207/10036* (2013.01); *G06T 2207/10048* (2013.01); *G06T 2207/20221* (2013.01)

(58) Field of Classification Search
CPC ............. G06T 5/50; G06T 2207/20221; G06T 2207/10024; G06T 2207/10048
See application file for complete search history.

(56) References Cited

U.S. PATENT DOCUMENTS

2017/0332017 A1* 11/2017 Robinson ........... H04N 5/23254
2019/0021580 A1* 1/2019 Mishima .................. A61B 1/00

* cited by examiner

*Primary Examiner* — Tapas Mazumder
(74) *Attorney, Agent, or Firm* — Wolter Van Dyke Davis, PLLC; John L. DeAngelis

(57) ABSTRACT

A system for fusing a direct image and a reflective image. The system comprises a first image sensor sensing the direct image from a scene where the direct image comprises direct image pixels. A second image sensor senses the reflective image from the scene where the reflective image comprising reflective image pixels. A component spatially registers the direct image pixels and the reflective image pixels. A digital processor fuses an intensity value of each direct image pixel and an intensity value of an aligned or registered reflective image pixel to generate a fused pixel value, where a plurality of fused pixel values forms a fused image that is displayed on a monitor.

18 Claims, 1 Drawing Sheet

FUSION OF THERMAL AND REFLECTIVE IMAGERY

CROSS REFERENCE TO RELATED APPLICATION

The present application claims priority, under 35 U.S.C. 119(e), to the provisional patent application filed on Sep. 4, 2018, assigned application No. 62/726,453, and entitled Resolution Enhancement of Color Images, which is incorporated herein.

FIELD OF THE INVENTION

This disclosure relates to imaging, and more particularly to fusing (combining) thermal and reflective imagery to provide enhanced viewing of the scene.

OBJECT OF THE INVENTION

Military and security applications need fused thermal and reflective images and especially fused thermal and image-intensified imagery for threat detection, driving, and aircraft pilotage.

BACKGROUND DESCRIPTION OF THE PRIOR ART

None of the prior art taken individually or collectively discloses and teaches a method for combining thermal and reflective imagery that provides the detailed scene rendition together with the lack of artifacts as provided by the current invention.

SUMMARY OF THE INVENTION

The invention described in this disclosure incorporates the same image fusion algorithm as described in two commonly-owned and patent applications: (1) entitled Color Night Vision Goggle, filed on Sep. 3, 2019 assigned application Ser. No. 16/558,419 and (2) entitled Resolution Enhancement of Color Images, filed on Sep. 3, 2020, and assigned application Ser. No. 16/558,745, both of which are incorporated herein in their entirety.

Thermal imaging captures emitted light from a scene whereas reflective imaging captures reflected light from the scene. Thermal and reflective imaging provide different information about the same scene. Of course, the techniques of the present invention can be used with virtually any scene.

Thermal imagers typically sense light having a wavelength in the three to five micron spectral band (called the mid-wave infrared or MWIR band) or the spectral band from eight to twelve microns (called the long-wave infrared or LWIR band).

Reflective imagery generally senses the visible, near infrared, or short wave infrared spectral bands. These are 0.4 to 0.65, 0.65 to 1.0, and 1.0 to 2.0 microns, respectively, although the specific limits of any of these spectral bands have not been standardized.

Currently, the most widely used reflective night vision technology incorporates image intensifiers operating in the near infrared spectral band having a range of about 0.6 microns to about 0.9 microns. As is known by those skilled in the art, an image intensifier is an optoelectronic device that increases the intensity of available light in an optical system. Under low-light conditions, such as at night, this facilitates visual imaging of low-light processes or conversion of non-visible light sources, such as near-infrared or short wave infrared, to visible light. The image intensifier operates by converting photons of light into electrons, amplifying the electrons (usually with a microchannel plate) then converting the amplified electrons back into photons for viewing.

The invention described herein fuses (combines) the spatial features of thermal and reflective images by pixel-by-pixel multiplication of the pixel-aligned (that is, spatially registered) images from two spectral bands. Since stark shadows can exist in imagery, a pixel intensity offset can be added to the images prior to the multiplication process. As is known by those skilled in the art, a stark shadow is created when an object, such as a building, blocks most light, but regions of the scene are illuminated, thus a part of the image will be a pure or almost black image region.

The examples in this application use LWIR imagery and image intensified NIR imagery, but the concepts can be applied to other spectral bands.

Figure 1:
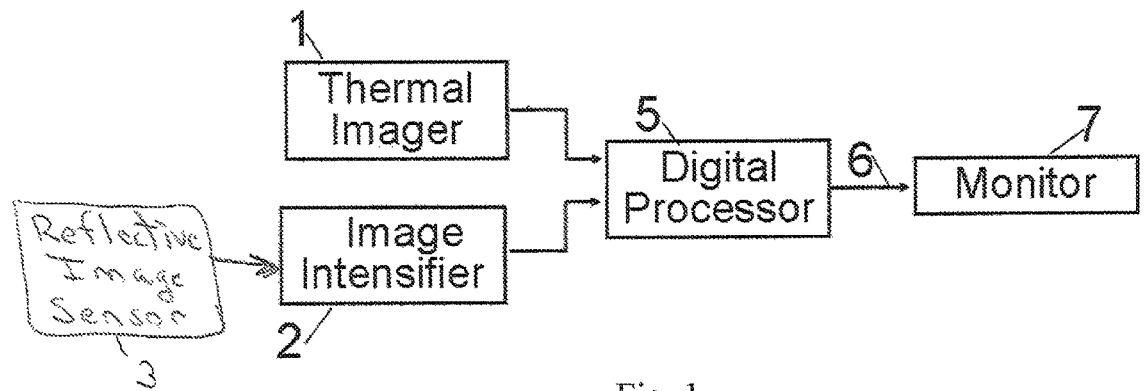
FIG. 1 illustrates a block diagram of the image fusion system of the present invention.

The drawings described herein are for illustrative purposes only; the drawings are of selected embodiments, and not all possible apparatus configurations are shown. The drawings are not intended to limit the scope of the present disclosure.

For clarity and in order to emphasize certain features, all of the invention features are not shown in the drawing, and all of the features that might be included in the drawing are not necessary for every specific embodiment of the invention. The invention also encompasses embodiments that combine features illustrated in the drawing; embodiments that omit, modify, or replace some of the features depicted; and embodiments that include features not illustrated in the drawing.

DETAILED DESCRIPTION OF THE PREFERRED EMBODIMENTS

The invention has the potential to be configured in multiple versions so as to generate superior technical performance in any given application. Therefore, it is understood that in some configurations not all elements will always be necessary for the specific embodiment or implementation of the invention. It should also be apparent that there is no restrictive one-to-one correspondence between any given embodiment of the invention and the elements in the drawing.

As used herein, relational terms, such as "first" and "second," "top" and "bottom," and the like, may be used solely to distinguish one entity or element from another entity or element without necessarily requiring or implying any physical or logical relationship or order between such entities or elements.

FIG. 1 depicts a thermal image sensor or thermal imager 1 and a reflective image sensor 3, that supplies an image signal to an image intensifier 2. Both sensors have the same, or close to the same, field of view and in one embodiment use a common boresight. That is, cameras associated with the thermal imager 1 and the reflective image sensor 3 capture images of the same area of a scene. In one embodiment, the thermal imager 1 operates in the LWIR spectral band and the reflective imager sensor 3 operates in the NIR band.

A digital processor 5 in FIG. 1 implements a fusion algorithm as described in the co-owned and co-pending applications identified above. The digital processor 5 also formats an output display signal 6 for display on a monitor 7.

Part of the digital processing associated with the present invention involves processes that can be implemented in many different ways in many different systems; digital processing for aligning images, enhancing contrast of the image(s), interpolating imagery to match a specific pixel count horizontally and vertically, and formatting display outputs, for example. Each of these processes are known in the art and are therefore not described in detail herein. Certain of these processes are described in the co-owned and co-pending applications noted above.

Within the digital processor 5 the thermal and intensified reflective images are registered to within a pixel over the field of view. The boresight alignment error, field of view differences, and optical distortion differences determines limits of the fusion process of the invention. Typically, the hardware is aligned as closely as practical by using a common field of view for the fused images and by pointing the cameras in the same direction. Then, more accurate alignment is performed in software by the digital processor 5. The registered or aligned pixels are referred to herein as corresponding registered or aligned pixels. If one of the cameras, assume the image intensifier camera in one embodiment, has better resolution and produces sharper images than the other camera (in this case the thermal imager camera), then alignment is based on aligning objects in each of the images to the same position and location in the field of view.

Figure 2:
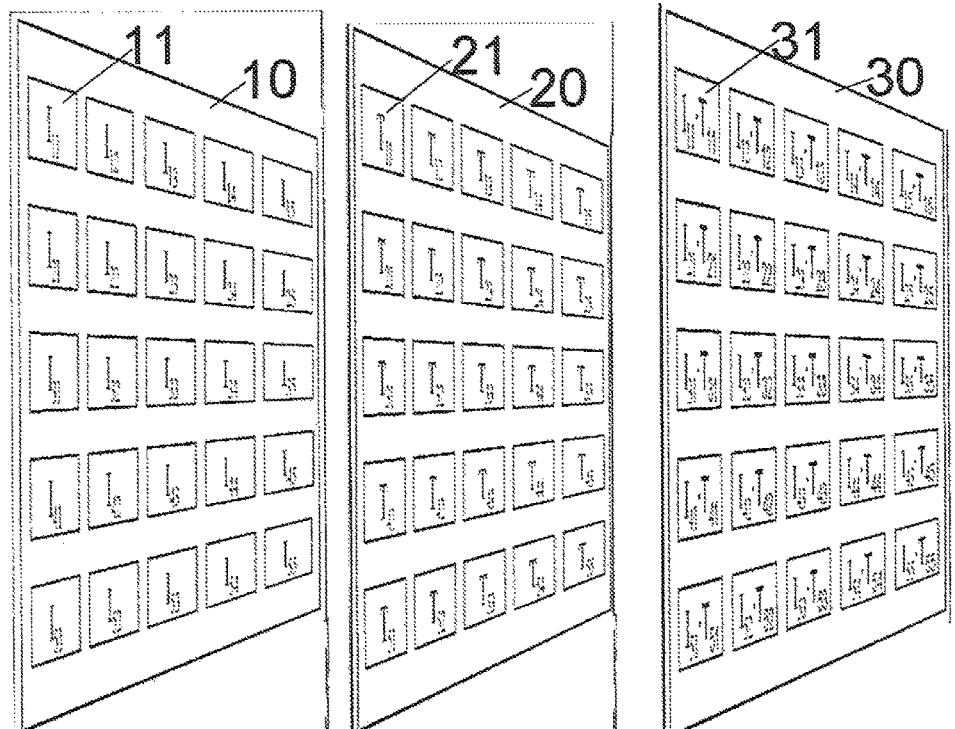
FIG. 2 illustrates a pixel intensity multiplication process.

In FIG. 2, a five-by-five pixel image intensified picture 10 (as derived from the image intensifier 2) and a five-by-five pixel thermal picture of the same scene 20 are fused to generate a fused image 30. A pixel 11, one pixel within the image intensified picture 10, has an intensity value denoted as $I_{11}$. A pixel 21, one pixel within the thermal image 20 has an intensity value denoted by $T_{11}$. In its simplest form, a first pixel 31 of the fused picture is created by multiplying $I_{11}$ and $T_{11}$. The intensity value of each one of the remaining pixels in the thermal and image intensified images are multiplied in a like manner to produce the fused image 30, comprising a plurality of multiplicative intensity values. That is, $I_{NM}$ multiplies $T_{NM}$ to produce fused image pixel $I_{NM} \cdot T_{NM}$ where the (·) represents multiplication.

In order to accommodate typical monitor gamma correction (normal intensity display mapping), the fused (multiplied) pixel intensities are raised to a 0.5 exponent or another value approximately equal to 0.5. That is, the intensity of the fused pixel (N,M) is $(I_{NM} \cdot T_{NM})^{0.5}$. The arithmetic operation of raising to a power is not shown in FIG. 2.

In another embodiment an offset value ($OFF_{set}$) is added to each pixel of the thermal and intensified images. The amplitude of $OFF_{set}$ is a fraction of the maximum value of the thermal image pixels or a maximum of the intensified image pixels. Use of the offset ensures that large areas of near zero intensity in the thermal or intensified images do not blank out large areas of the fused image.

Offsetting the pixel intensity values and raising the intensity multiplicative products to the 0.5 power are both optional process that, in most embodiments, can improve the quality of the image displayed on the monitor 7.

The following statements set forth the algorithm for fusing the thermal images with pixel intensities $T_{NM}$ with intensified reflective images with pixel intensities $I_{NM}$, where N specifies the $N^{th}$ pixel in a row and M specifies the row. Toffset (the offset value for the thermal image) and Ioffset (the offset value for the image intensified image) are fractions less than one and can be, but need not be, equal.

For convenience in describing the fusion algorithm, pixel intensities (the amplitude) are normalized to one before processing, and then the fused image amplitude is formatted to the display interface standard.

Imin=minimum intensified reflective image pixel intensity

Tmin=minimum thermal image pixel intensity

Imax=maximum intensified reflective image pixel intensity

Tmax=maximum thermal image pixel intensity $Fused_{NM}$=pixel intensity of fused image pixels $Fused_{NM} = \{[(I_{NM}-Imin)/Imax+IOFF_{set}] \cdot [(T_{NM}-Tmin)/Tmax+TOFF_{set}]\}^{0.5}$ The fused image intensity values are then formatted to meet the display interface standard.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A system for fusing a direct image and a reflective image, the system comprising:
    a first image sensor for sensing the direct image from a scene, the direct image comprising direct image pixels;
    a second image sensor for sensing the reflective image from the scene, the reflective image comprising reflective image pixels;
    a digital processor for spatially registering the direct image pixels and the reflective image pixels;
    the digital processor for fusing an intensity value of each direct image pixel and an intensity value of a registered reflective image pixel to generate a fused pixel value, a plurality of fused pixel values forming a fused image;
    the digital processor for processing the fused pixel values for displaying the fused image on a monitor; and
    wherein fusing the intensity values comprises multiplying the intensity value of each direct image pixel and the intensity value of a registered reflective image pixel.

2. The system of claim 1, wherein the first image sensor comprises a thermal image sensor for sensing direct thermal radiation from the scene and the second image sensor comprises a visible image sensor for sensing reflected visible radiation from the scene.

3. The system of claim 2, wherein the thermal radiation occupies a wavelength between 3 microns and 5 microns.

4. The system of claim 2, wherein the thermal radiation comprises long-wave infrared radiation occupying a wavelength between 8 microns and 12 microns.

5. The system of claim 2, wherein the direct thermal radiation comprises medium wave infrared radiation or longwave infrared radiation.

6. The system of claim 1, wherein the first image sensor comprises a first thermal image sensor for sensing direct thermal radiation from the scene and the second image sensor comprises a second thermal image sensor for sensing near infrared or short wave infrared radiation reflected from the scene.

7. The system of claim 1, wherein the digital processor processing the fused pixel values further comprises the digital processor raising each fused pixel value to approximately a 0.5 power, then processing the fused pixel values for displaying.

8. The system of claim 1, wherein the digital processor adds a first offset value to each direct image pixel and a second offset value to each reflective image pixel before fusing the intensity values.

9. The system of claim 1 wherein the digital processor for fusing an intensity value of each direct image pixel and an intensity value of a registered reflective image pixel to generate the fused pixel value, comprises fusing according to a formula, $$Fused_{NM} = [(I_{NM} - Imin)/Imax] \cdot [(T_{NM} - Tmin)/Tmax]$$

where
$I_{NM}$=intensity of a reflective image pixel at row N and column M
$T_{NM}$=intensity of a direct image pixel at row N and column M
Imin=minimum intensity of all reflective image pixels
Tmin=minimum intensity of all direct image pixels
Imax=maximum intensity of all reflective image pixels
Tmax=maximum intensity of all direct image pixels
$Fused_{NM}$=intensity of a fused image pixel at row N and column M.

10. The system of claim 1 wherein the digital processor for fusing an intensity value of each direct image pixel and an intensity value of a registered reflective image pixel to generate a fused pixel value, comprises fusing according to a formula, $$Fused_{NM} = \{[(I_{NM} - Imin)/Imax] \cdot [(T_{NM} - Tmin)/Tmax]\}0.5$$

where
$I_{NM}$=intensity of a reflective image pixel at row N and column M
$T_{NM}$=intensity of a direct image pixel at row N and column M
Imin =minimum intensity of all reflective image pixels
Tmin =minimum intensity of all direct image pixels
Imax =maximum intensity of all reflective image pixels
Tmax =maximum intensity of all direct image pixels
$Fused_{NM}$=intensity of a fused image pixel at row N and column M.

11. The system of claim wherein the digital processor for fusing an intensity value of each direct image pixel with an intensity value of a registered reflective image pixel to generate a fused pixel value, comprises fusing according to a formula, $$Fused_{NM} = \{[(I_{NM} - Imin)/Imax + Ioffset] \cdot [(T_{NM} - Tmin)/Tmax + Toffset]\}0.5$$

where
$I_{NM}$=intensity of a reflective image pixel at row N and column M
$T_{NM}$=intensity of a direct image pixel at row N and column M
Imin =minimum intensity of all reflective image pixels
Tmin =minimum intensity of all direct image pixels
Imax =maximum intensity of all reflective image pixels
Tmax =maximum intensity of all direct image pixels
Toffset =the offset value for the direct image
Ioffset =the offset value for the reflective image
$Fused_{NM}$=intensity of a fused image pixel at row N and column M.

12. The system of claim 11 wherein an intensity value of each pixel of a displayed image is defined by displayed image=display scale multiplier*($Fused_{NM}$ - $Fused_{minimum}$)/$Fused_{maximum}$ where
display scale multiplier=multiplier to scale a normalized image to a display dynamic range
$Fused_{minimum}$=a minimum fused pixel value
$Fused_{maximum}$=a maximum fused pixel value.

13. A system for fusing a direct thermal image and a reflective image of a scene, the system comprising:
a thermal image sensor for sensing the direct thermal image from the scene, the direct thermal image comprising direct thermal image pixels;
a reflective image sensor for sensing the reflective image from the scene, the reflective image comprising reflective image pixels;
a component for spatially registering the direct thermal image pixels and the reflective image pixels;
a digital processor for fusing an intensity value of each direct thermal image pixel and an intensity value of a registered reflective image pixel to generate a fused pixel value, a plurality of fused pixel values comprising a fused image;
the digital processor for processing the fused pixel values for displaying the fused image on a monitor; and
wherein the digital processor for fusing an intensity value of each direct thermal image pixel with an intensity value of a registered reflective image pixel to generate a fused pixel value, comprises fusing according to a formula, $$Fused_{NM} = \{[(I_{NM} - Imin)/Imax + Ioffset] \cdot [(T_{NM} - Tmin)/Tmax + Toffset]\}0.5$$

where
$I_{NM}$=intensity of a reflective image pixel at row N and column M
$T_{NM}$=intensity of a direct thermal image pixel at row N and column M
Imin=minimum intensity of all reflective image pixels
Tmin=minimum intensity of all direct thermal image pixels
Imax=maximum intensity of all reflective image pixels
Tmax=maximum intensity of all direct thermal image pixels
Toffset=the offset value for the direct thermal image
Ioffset=the offset value for the reflective image
$Fused_{NM}$=intensity of a fused image pixel at row N and column M.

14. The system of claim 13, wherein the reflective image sensor comprises a visible image sensor, a near infrared sensor, or short wave infrared sensor.

15. The system of claim 13 wherein an intensity value of each pixel of a displayed mage is defined by displayed image=display scale multiplier*(Fused$_{NM}$-Fused$_{minimum}$)/Fused$_{maximum}$ where display scale multiplier=multiplier to scale a normalized image to a display dynamic range Fused$_{minimum}$=a minimum fused pixel value Fused$_{maximum}$=a maximum fused pixel value.

16. A method for fusing a direct image and a reflective image, the method comprising:

sensing the direct image from a scene, the direct image comprising direct image pixels;

sensing the reflective image from the scene, the reflective image comprising reflective image pixels;

spatially registering the direct image pixels and the reflective image pixels;

multiplying an intensity value of each direct image pixel and an intensity value of a registered reflective image pixel to generate a multiplied pixel value, a plurality of multiplied pixel values comprising a multiplied image; and processing the multiplied pixel values for displaying the multiplied image on a monitor.

17. A system for fusing a thermal image and a color image, the system comprising:

a thermal image sensor for sensing thermal radiation from a scene and responsive thereto for generating a thermal image comprising thermal image pixels;

a color image sensor for sensing a color triad from the scene and responsive thereto for generating a reflective image comprising reflective image pixels;

a component for spatially registering the thermal and reflective image pixels;

a digital processor responsive to an output signal from the thermal image sensor representing the thermal image and an output signal from the color image sensor representing the color image, the digital processor for multiplying an intensity value of each thermal image pixel and an intensity value of a registered reflective image pixel to generate a multiplied pixel value, a plurality of multiplied pixel values comprising a multiplied image for display on a color monitor.

18. The system of claim 17, wherein the color triad comprises a blue, a red, and a green light.

\* \* \* \* \*